(12) United States Patent
Wu (10) Patent No.: US 9,292,070 B2
(45) Date of Patent: Mar. 22, 2016

(54) METHOD AND APPARATUS WITH STOCHASTIC CONTROL BASED POWER SAVING OPERATION

(75) Inventor: Bin Wu, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 713 days.

(21) Appl. No.: 13/411,981

(22) Filed: Mar. 5, 2012

(65) Prior Publication Data

US 2013/0232346 A1 Sep. 5, 2013

(51) Int. Cl.
*G06F 1/26* (2006.01)
*G06F 1/32* (2006.01)
*G06F 7/58* (2006.01)
*G06F 11/22* (2006.01)
*G06F 9/50* (2006.01)
*G06F 11/07* (2006.01)

(52) U.S. Cl.
CPC ............. *G06F 1/3228* (2013.01); *G06F 1/324* (2013.01); *G06F 1/3243* (2013.01); *G06F 1/3296* (2013.01); *G06F 7/582* (2013.01); *G06F 7/588* (2013.01); *G06F 9/505* (2013.01); *G06F 11/0724* (2013.01); *G06F 11/2236* (2013.01); *G06F 2209/5019* (2013.01); *Y02B 60/1217* (2013.01); *Y02B 60/1239* (2013.01); *Y02B 60/1285* (2013.01)

(58) Field of Classification Search
CPC ......... G06F 7/582; G06F 7/588; G06F 9/505; G06F 11/0724; G06F 11/2236; G06F 2209/5019
USPC .................................. 713/300, 320, 321, 322
See application file for complete search history.

(56) References Cited

U.S. PATENT DOCUMENTS

2010/0095137 A1* 4/2010 Bieswanger et al. ......... 713/300
2012/0033612 A1* 2/2012 Jazra ............................ 370/328

* cited by examiner

*Primary Examiner* — Michael J Brown
(74) *Attorney, Agent, or Firm* — Faegre Baker Daniels LLP (57) ABSTRACT

A method and apparatus controls power consumption of at least one processor core by generating dynamic voltage and clock frequency scaling control information based on stochastic controller control parameters and workload performance error data. A processor core's voltage and clock frequency is varied based on the generated dynamic voltage and clock frequency scaling control information. In one example, a stochastic controller, is coupled to a dynamic voltage and clock frequency scaling (DVFS) circuit. The stochastic controller uses the stochastic controller control parameters and workload performance error data and generates the dynamic voltage and clock frequency scaling control information to control the DVFS circuit. Related methods are also disclosed.

20 Claims, 6 Drawing Sheets

METHOD AND APPARATUS WITH STOCHASTIC CONTROL BASED POWER SAVING OPERATION

BACKGROUND OF THE DISCLOSURE

The disclosure relates generally to methods and apparatus for providing reduced power consumption in devices and, more particularly, to processors and systems that employ dynamic voltage and frequency scaling systems for power saving operations.

The evolution of modern processor architectures, in conjunction with technology scaling, has produced processors with higher performance to meet today's increasing computational demands, and also helped make power efficiency one of the paramount design concerns and objectives for a wide spread of enterprise-class and embedded processors. In addition to saving energy, proper reduction of power consumption can lead to dramatic benefits in reducing thermal hot spots and the cost of chip-cooling. To this end, dynamic voltage and clock frequency scaling (DVFS) has become a key avenue for achieving power efficiency via adjustment of the operating voltage and frequency of processors in runtimes for devices such as web servers, smart phones, tablet devices, laptops and other devices.

A body of research has been devoted to DVFS, for instance, through heuristic techniques that are geared towards ensuring processor utilization. However, one central challenge in developing DVFS schemes is to balance two competing objectives: maximizing of power saving and guaranteeing tight performance. The latter is particularly critical for latency-sensitive applications that require a high-degree of quality of service (QoS).

Real-time requirements in devices can be dictated by applications that are executing; such as in the context of a smart phone, watching video requires, for example, a processor to generate frames of video for display wherein some frames can require more computations than others. For example, certain portions of video may contain action portions and others may have still landscape images during a movie and the video processor needs to adjust its processing speed to accommodate outputting the appropriate pixel information at the appropriate time. Workload for the processor, which may include multiple cores, for example CPUs or any other suitable processor, utilize streams of instructions.

For other systems such as web servers, power reduction is very important particularly with large numbers of web servers. As known web servers may include multiple processors (for example, they each include multiple CPU cores) that wherein a web server may be required to send the same web page or content to thousands of users or may be required to send differing web pages to multiple users requiring huge variations in workload requirements.

Previous heuristic methods usually design the power saving control algorithms for specific workload inputs. However, because of the random nature of the actual workloads, these control algorithms may not achieve satisfactory performance in terms of real-time or QoS metrics.

Accordingly, a need exists for improved power saving methods and apparatus.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, a method and apparatus controls power consumption of at least one processor core by generating dynamic voltage and clock frequency scaling control information based on stochastic controller control parameters and workload performance error data. A processor core's voltage and clock frequency is varied based on the generated dynamic voltage and clock frequency scaling control information. In one example, a stochastic controller, is coupled to a dynamic voltage and clock frequency scaling (DVFS) circuit. The stochastic controller uses the stochastic controller control parameters and workload performance error data and generates the dynamic voltage and clock frequency scaling control information to control the DVFS circuit. In one example, the stochastic controller control parameters may be generated by the processor core, for example, based on processor core runtime workload information from one or more processor cores and based on applying a random process decomposition operation on the runtime workload information. The stochastic controller control parameters are generated by, if desired, collecting large amounts of processor workload traces, calculating statistics, such as auto correlation functions of the workload. The workload is then represented by a set of random process decompositions, such as a Karhunnen Loeve expansion (KLE). These decompositions generally represent the workload random processes as a sum of products of deterministic functions (in time) and random variables. The deterministic coefficient functions are collected from random process decomposition and the controller through the stochastic controller control parameters is set up to minimize the control errors to these deterministic functions. Among other advantages, utilizing statistical analysis of the processor workload either during runtime or offline, can result in a more efficient power management system over time. A stochastic minimization of workload performance error is provided through the feedback operation. A load-aware stochastic approach can significantly reduce processor power consumption.

In one example, the stochastic controller is comprised of a proportional-integral-derivative (PID) controller that uses the stochastic controller control parameters and the dynamic voltage and clock frequency scaling circuit uses input from the PID controller as well as information representing an amount of stall of the at least one processor core to determine an appropriate voltage and frequency setting for operation of the at least one processor core. The stochastic controller, DVFS circuit and processor core(s) may be implemented in an integrated circuit or distributed among multiple integrated circuits.

Also disclosed herein is a processor core power control design system, such as a uniquely programmed work station, that includes one or more processors and memory. The non-transitory memory contains executable instructions that when executed by the one or more processors causes the processor core power design system to determine stochastic controller control parameters for a dynamic voltage and clock frequency scaling control system. This is done by applying a random process decomposition operation on random workload input information (e.g., samples) of a processor core and other operations, set forth below, to generate stochastic controller control parameters for a stochastic controller. In one example, the random process decomposition operation includes employing a Karhunnen Loeve expansion (KLE) operation.

The stochastic DVFS control scheme provides a tight performance operation without over-provision of the resources as in DVFS techniques that target applications with hard deadlines. A proper characterization of workload characteristics, under a stochastic framework avoids unnecessarily high utilization of the processor, hence energy waste, and the risk of performance degradation. This allows for a full consideration of workload properties during the design phase of DVFS schemes or driving processor runtime, and provides a basis for optimized load-aware power saving and performance assurance. Specifically, for any given class of applications (e.g., web servers), a random process decomposition operation is performed on the workload information. In one example, a Karhunnen Loeve Expansion (KLE) based workload characterization methodology is employed. This KLE approach models a class of workloads as a random process by decomposing it into a sum of statistically weighted deterministic orthogonal basis functions.

One benefit of KLE is that it extracts the stochastic structure of workloads by revealing the temporal and frequency contents of various components (basis functions) and their stochastic significances (weights). By leveraging the KLE-based workload characterization, systematic feedback controller design approaches are developed for DVFS while maintaining a tight performance guarantee. The design of the stochastic controller is formally formulated as a problem of stochastic minimization of the runtime performance error. The stochastic performance error (also referred to as workload performance error data) is analyzed and an optimization problem is solved in either the time or the frequency domain. The resulting DVFS control system optimally adjusts the supply voltage and clock frequency in the sense that the statistically averaged performance error across all workloads of the characterized family is designed to reach a desired level such as a desired minimum level, whereas in practical terms, the variation of the performance error is also very small. When applied to runtime sampling, the probability of requiring an increase or decrease in power consumption is used to determine the DVFS settings.

The performance of the stochastic DVFS controller design is demonstrated in this disclosure using a number of workloads. In addition to the significant power saving brought by DVFS, the proposed load-aware approach produces controllers capable of tracking dynamic loads with very low performance error, delivering a performance guarantee that is much tighter than what is achievable through the previous method. The recent work of Ayoub et al. ("Os-Level Power Minimization Under Tight Performance Constraints in General Purpose Systems", In *ISLPED*, pages 321-326, August, 2011) proposes an ad-hoc method to DVFS through the use of an arbitrarily chosen fixed first-order linear controller, however, with the drawback being not workload aware. In contrast, the presented approach takes the stochastic nature of workloads into consideration and effectively transforms the stochastic controller design problem into a controller optimization problem under a set of characterized deterministic inputs. This allows one to choose not only the gain of the controller, but also its order and frequency characteristics in a way that are optimal for the set of characterized workloads.

Figure 1:
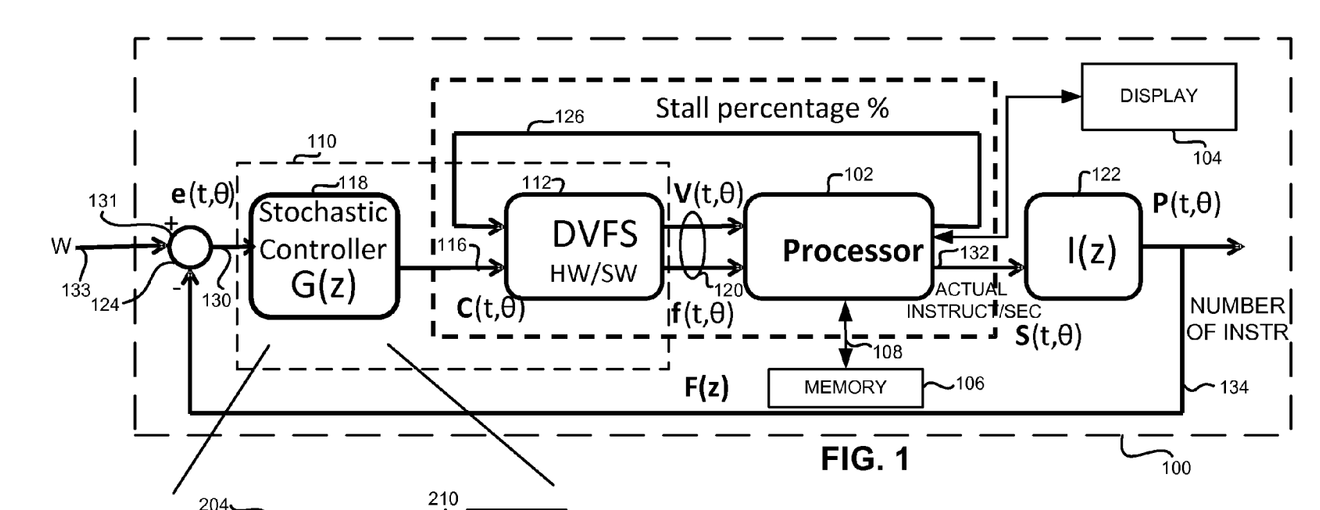
FIG. 1 is a block diagram illustrating one example of an apparatus in accordance with one embodiment of the disclosure.

FIG. 1 illustrates one example of an electronic apparatus 100 such as, but not limited to, a smart phone, tablet device, laptop, web server, desktop computer printer, high definition television, or any other suitable apparatus that employs one or more processor cores. In this example, a processor core 102 is shown coupled to a display 104. It will be recognized that the high level diagram does not show intervening circuitry as known in the art to facilitate ease of discussion. In this example, the processor core 102 may be, for example, a central processing unit core, graphics processing core, or any other suitable processor core. The apparatus 100 also includes memory 106 used by the processor core 102 and accessed through one ore more suitable buses 108. The memory may be any suitable memory including, but not limited to, RAM, ROM, DRAM, optical memory or any other suitable type of memory. The memory 106 may be structured as multiple memory arrays, and may include register sets if desired or any other suitable memory device.

The device 100 also includes a dynamic voltage and clock frequency scaling control system 110 that in this example, includes a dynamic voltage and clock frequency scaling (DVFS) circuit 112 that varies processor core voltage and clock frequency for the processor core 102 based on dynamic voltage and clock frequency scaling control information 116 and/or data representing an amount of processor stall 126. A stochastic controller 118 generates the dynamic voltage and clock frequency scaling control information 116 based on stochastic controller control parameters (stored, hardwired or generated in real-time) and workload performance error data.

The dynamic voltage and clock frequency scaling circuit 112 includes the requisite voltage adjustment and frequency scaling circuitry as known in the art and includes hardware in the form of a state machine, dedicated logic, or may be the processor 102 executing stored code or executing on another processor if desired to select the frequency voltage level to get the appropriate processor execution speed.

This may include determining the processor speed setting based on a proportion of the stall percentage (such as, for example, an amount of instruction pipeline stall during a chosen period of time). For example, the DVFS may include logic that performs the calculation: $C(t, \theta)/(1-\text{stall percentage})$=processor speed setting. The DVFS circuit may then, for example, determine the appropriate voltage level and frequency setting information 120 based on, for example, a lookup table or any other suitable operation using the calculated speed setting. For example, the lookup table may include voltage and frequency pairs to indicate that a particular voltage is needed and a particular frequency setting. A particular frequency setting can be associated with a particular processor speed. It will be recognized that any other suitable criteria may also be employed.

The DVFS circuit 112 may be a conventional DVFS circuit that provides differing voltage and clock frequency setting signals (e.g., bits) 120 for the processor 102 to increase or decrease the power consumption of the processor core 102. An integrator circuit 122 is shown coupled to the processor 102. A summing circuit 124 sums error information which is input to the stochastic controller 118 as further described herein. The processor core 102 may also, during runtime, determine an amount of stall percentage over a given period of time through known techniques. This data representing stall percentage is shown as data 126 which is used by the DVFS circuit 112 to determine a suitable processor core voltage and clock frequency. This is further described below. As shown in this example, the DVFS circuit includes the requisite voltage supply control circuitry and clock frequency control circuitry as known in the art. However, it will be recognized that the DVFS operation may be incorporated as part of the processor core 102, if desired. However, it is shown diagrammatically for ease of illustration as providing the supply voltage and clock frequency 120 to the processing core 102.

Figure 2:
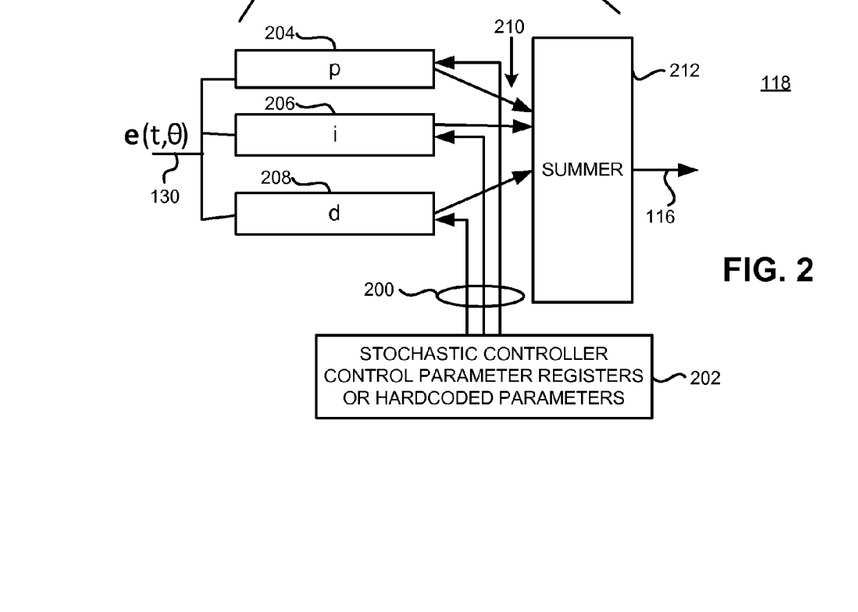
FIG. 2 is a block diagram illustrating one example of a DVFS control system stochastic controller in accordance with one embodiment of the disclosure.

FIG. 2 illustrates one example of the stochastic controller 118 shown in FIG. 1. As shown in this example, the stochastic controller 118 may be implemented as a state machine, the processor 102 expecting suitable code, or any suitable structure. In this example, the stochastic controller 118 is implemented as a proportional-integral-derivative controller (PID) operational to use stochastic controller control parameters 200 that may be hard coded or as shown in this example, stored in stochastic controller control parameter registers 202. As known in the art, a PID controller includes a proportional circuit 204, and integral circuit 206 and a derivative circuit 208 whose outputs generally shown as 210 are provided to a summing circuit 212 which sums the outputs of the respective circuits 204-208 and generates the controller output which is dynamic voltage and clock frequency scaling control information indicating whether to increase or decrease the performance of the processor and by how much. When implemented in an integrated circuit, the registers 202 may be accessible by the processor 102 so that the processor can suitably change the stochastic controller control parameters during runtime if desired as further set forth below. Alternatively, the stochastic controller control parameters can be hardwired or fused so they are not changeable. Also, the processor may implement the stochastic controller as part of the processor as an operating system function or device function.

Referring back to FIG. 1, the DVFS control system is formulated as a stochastic control system. The system input is treated as a random process W(t, θ) (based on real-time data or based on workload data captured, stored, and later evaluated). It is referred to as the workload information of the processor. When input during runtime, the information is referred to as runtime workload information. This processor workload input is determined either by real-time requirements of the applications or by the quality of service requirements. In this example, workload is defined as the number of instructions, which need to be executed on the processor core 102 to meet the real-time or QoS requirements. However, any suitable criteria can be used. A software driver executing on the processor may count the number of instructions executed from a starting time $t_0$. For discussion $t_0=0$. Due to this random workload input, other state variables in the system are all random processes. The system output P(t, θ) is referred to as the performance of the processor. Performance is defined, in this example, as the number of instructions which are actually executed by the processor since the starting time $t_0$.

A goal is to control the actual performance data of the processor P(t, θ) 134 to track the desired workload W(t, θ). System error e(t, θ) is the difference between the performance P(t, θ) and W(t, θ). In other words, the goal is to minimize system error e(t, θ). In this example, if the actual processor workload information P(t, θ) is the number of instructions actually executed by the processor 102 during a period and W is the desired workload information represented as a desired number of instruction to be executed from a starting time, then the performance error e also referred to as workload performance error data, is the difference between the actual number of instructions executed and the desired number of instructions executed.

In FIG. 1, the stochastic controller 118 G(z) is designed to make the performance of the processor P(t, θ) meet the W(t, θ). The stochastic controller 118 G(z) takes the workload performance error data 130 as input and generates the DVFS control information 116 also referred to as processor speed-setting signal C(t, θ). A summer 131 compares the actual performance data of the processor, to the desired and outputs the difference as the error data. Transfer function F(z) represents the behavior of DVFS circuit 112 and the processor 102. For the sake of simplicity, it is referred to as the processor. The processor DVFS F(z) takes the processor speed-setting signal 116 as input, produces the processor voltage and clock frequency through the voltage and frequency clock setting signals 120 accordingly, and produces the effective speed of the processor. This effective speed is measured by the number of instructions actually executed by the processor per unit time in this example. This metric is commonly defined as instructions per second (IPS), and it accounts for processor stalls caused by real-world non-idealities, such as memory access time, resource waiting, interrupts etc. The DVFS circuit 112 can monitor and take into account the stall time percentage 126 in real-time and adjust the effective processor speed to the setting speed C(t, θ). For example, if the processor (or any other suitable stall detection circuit) detects the current stall time percentage of the processor is 50%, to reach 100 actual instructions per unit time speed, it would set the processor work at 200 instruction speed level to offset the stall time percentage. If the DVFS circuit 112 can achieve good compensation in real-time and the processor block F(z) can be approximated by a proportional block. That is F(z)=K, where K is a constant. Following the F(z) block is an integrator 122, which transfers the actual speed of the processor 132 to the performance of processor (i.e., the number of executed instructions). This is used to generate the system errors and performance signals. The integrator, if used can be implemented as a circuit or as software executing in the processor as known in the art. The actual processor speed information 132, such as the number of instructions executed per unit time, may be determined by logic or a driver executing on the processor that uses an instruction counter to detect the value.

Accordingly, the electronic apparatus 100 employs at least one processor core 102. There may be multiple processor cores controlled by the same or multiple stochastic controllers and DVFS circuits. In this example, the dynamic voltage and clock frequency scaling circuit 112 varies at least one processor core voltage and clock frequency for the at least one processor based on dynamic voltage and clock frequency scaling control information 116. The stochastic controller 118 generates the dynamic voltage and clock frequency scaling control information 116 based on stochastic controller control parameters 200, and workload performance error data 130. In one example, the processor core 102 generates the stochastic controller control parameters 200 based on processor core runtime workload information 133. The stochastic controller control parameters 200 are also generated based at least in part on applying a random process decomposition operation on the runtime workload information 133 as further set forth below. By way of example, this may be done by recording in memory a long runtime workload trace and dividing the workload trace into multiple equal length shorter workload traces. The shorter workload traces may then be used as multiple samples of an input workload random process in mean and auto correlation matrix calculations as further set forth below. The processor core by executing executable instructions stored in memory 106 perform the random process decomposition operation and other operations needed to generate the stochastic controller control parameters. This may be done, for example, by applying the random process decomposition operation on the runtime workload information 133 by applying a Karhunnen Loeve Expansion (KLE) as part of a stochastic controller control parameter generation operation. This is further set forth below.

Depending upon the type of apparatus 100, it may be desirable to store a plurality of sets of stochastic controller control parameters 200 in memory such that a particular set may correspond to different types of applications executing on the apparatus. By way of example, one set of stochastic controller control parameters for use by the stochastic controller 118 based on determined changes in processor core workload information may be used before real-time video and audio processing applications whereas a different set of stochastic controller control parameters may be applied for use for non-real-time data processing applications.

Referring again to FIG. 2, the stochastic controller 118 in the example of being a proportional-integral-derivative controller, uses the stochastic controller control parameters 200 as set forth below. The dynamic voltage and clock frequency scaling circuit 112 varies the processor core voltage and clock frequency using the setting information 120 based on data representing an amount of stall of the processor core shown as data 126 as well as the DVFS control information 116. As noted above, the processor core 102 can be any suitable processor core including, but not limited to, a central processor core, graphics processor core and multiple processor cores may be employed each with their own stochastic controller and DVFS circuit 112 or multiple processor cores may share the stochastic controller and DVFS circuits.

Figure 3:
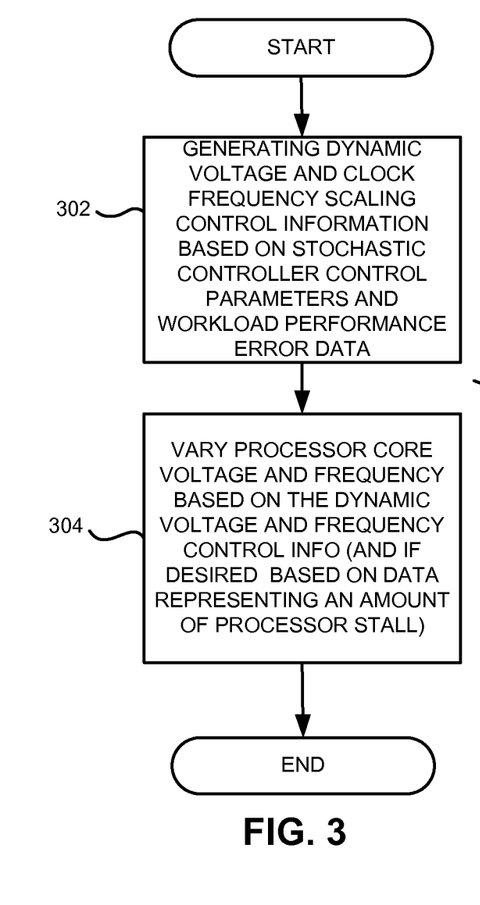
FIG. 3 is a flowchart illustrating one example of a method for controlling power consumption of a processor core in accordance with one example set forth in the disclosure.

Referring to FIG. 3, a method for controller power consumption of at least one processor core 300 is shown. The method may be carried out, for example, by the apparatus 100 or by any other suitable structure. The methods will be described with reference to the structure of FIG. 1, however it will be recognized that any suitable structure may employ the method. It will also be recognized that operations may be rearranged as desired and the description herein is but one example. As shown in block 302, the method includes generating dynamic voltage and clock frequency scaling control information 116 based on stochastic controller control parameters 200 and workload performance error data 130. This may be done, for example, by the stochastic controller 118 which utilizes programmable or hard coded stochastic controller control parameters as part of a PID controller which operates on the workload performance error data 130 to generate the DVFS control information 116.

As shown in block 304, the method includes varying the processor core voltage and clock frequency for the processor core based on the generated dynamic voltage and clock frequency scaling control information 116. This may be performed, for example, by the DVFS circuit which may also take into account the amount of stall percentage that the processor is undergoing including the speed information indicated by the DVFS control information 116. Suitable voltage and frequency setting signals 120 can then be provided to the processor so the processor's speed is sped up or reduced depending upon the amount of error detected.

Figure 4:
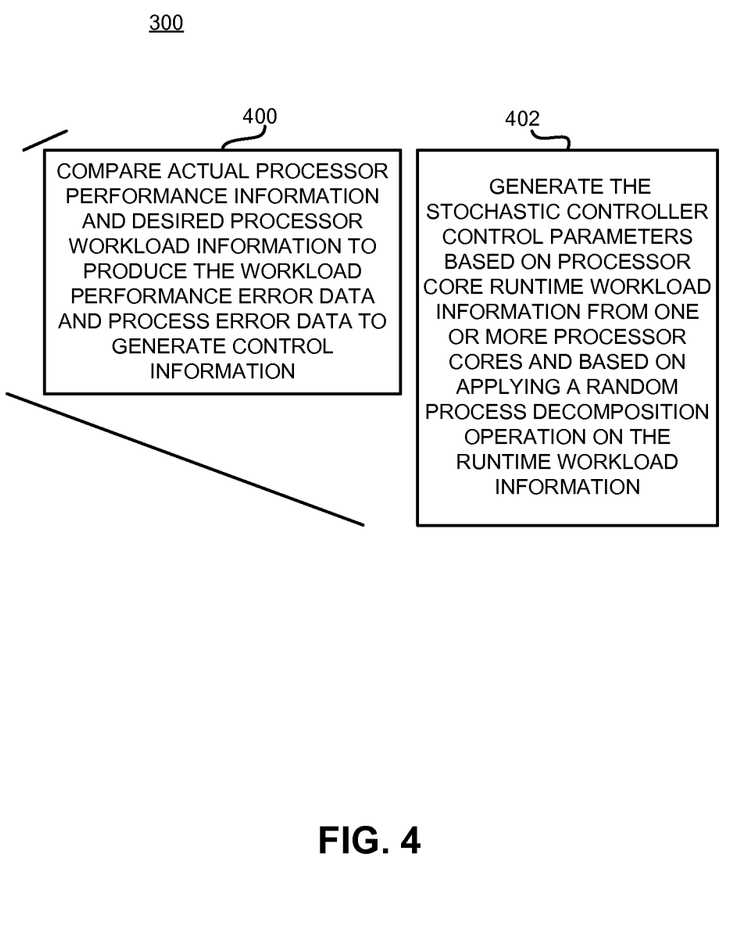
FIG. 4 is a flowchart illustrating examples of a process shown in FIG. 3.

Referring to FIG. 4, operations that may be included as part of the generating the dynamic voltage and clock frequency scaling control information block 302 will be described. As shown in block 400, a comparison of the actual processor performance information 134 and desired processor workload information 133 is performed, in this example, by the summer 131 to produce the workload performance error data 130. As shown in block 402, the method may include generating the stochastic controller control parameters 200, such as by the processor 102 on a periodic basis during runtime, for example, based on processor core runtime workload information 133 and based on applying a random process decomposition as part of the operations on the runtime workload information is further set forth below.

Figure 5:
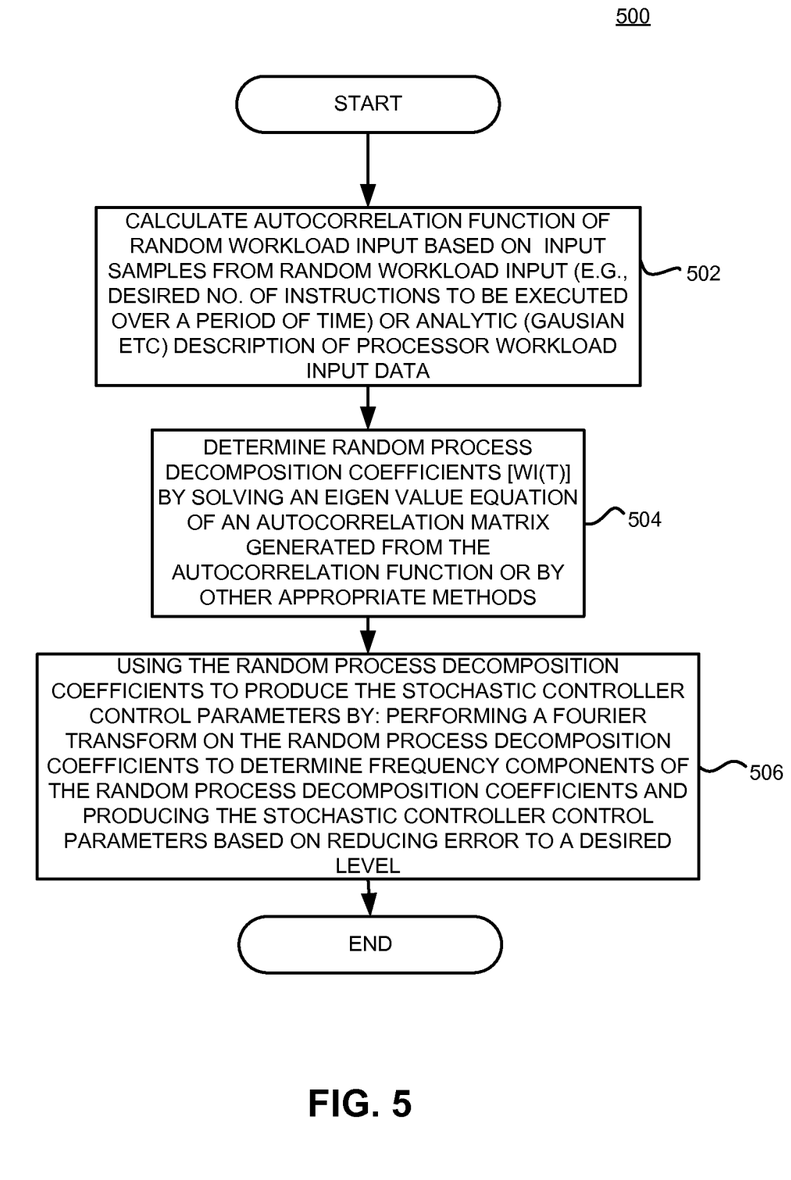
FIG. 5 is a flowchart illustrating one example of a method for determining stochastic controller control parameters in accordance with one example set forth in the disclosure.

FIG. 5 illustrates a method 500 for controlling power consumption of at least one processor in accordance with one aspect of the disclosure that may be carried out, for example, by any suitable structure but in this example, may be performed by the processor 102 during runtime, or may be performed by a processor core power control design system apriori and offline to determine the stochastic controller control parameters to be stored in a device. As shown in block 502, the method includes calculating an auto correlation function of a random workload input 133 based on input samples from the random workload input or based on an analytic description of processor workload input data. For example, if actual runtime information the workload information is not being used, and the method is being employed by an offline system, a Gaussian description of processor workload may be used as the workload input data 133 as further set forth below. As shown in block 504, the method includes determining random process decomposition coefficients (also described below) by solving an eigenvalue equation of an auto correlation matrix generated from the auto correlation function or other appropriate methods. As shown in block 506, the method may include using the random process decomposition coefficients to produce the stochastic controller control parameters by performing a Fourier transform on the random process decomposition coefficients to determine frequency components of the random process decomposition coefficients and by producing the stochastic controller control parameters based on reducing error to a desired level. This is also further set forth below.

The operations include, for example, calculating an auto correlation function of a random workload input based on input samples from the random workload input and putting in a matrix format, the auto correlation function and solving the eigenvalue equation for the auto correlation matrix. The method includes assembling the values to get the KLE coefficients and producing the stochastic controller control parameters to minimize the control errors based on the KLE coefficients.

Figure 6:
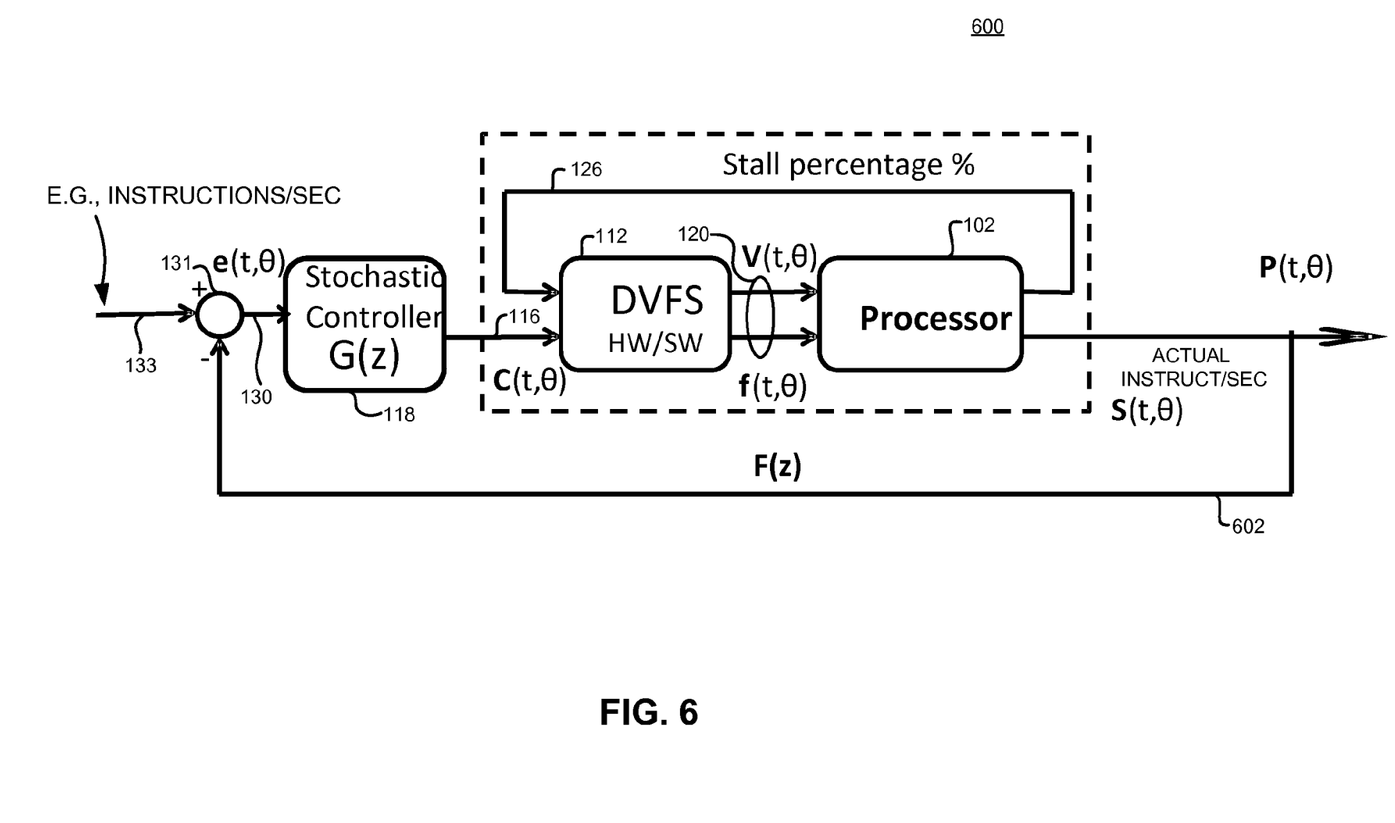
FIG. 6 is a block diagram illustrating one example of an electronic apparatus that employs a dynamic voltage and clock frequency scaling control system in accordance with one example set forth in the disclosure.

FIG. 6 is a block diagram illustrating another example of an apparatus 600 having similar blocks previously described except in this example, the integrator 122 is not used so that a different metric such as a number of actual executed instructions per second 602 and desired instructions to be executed per second are used as the performance criteria.

Figure 7:
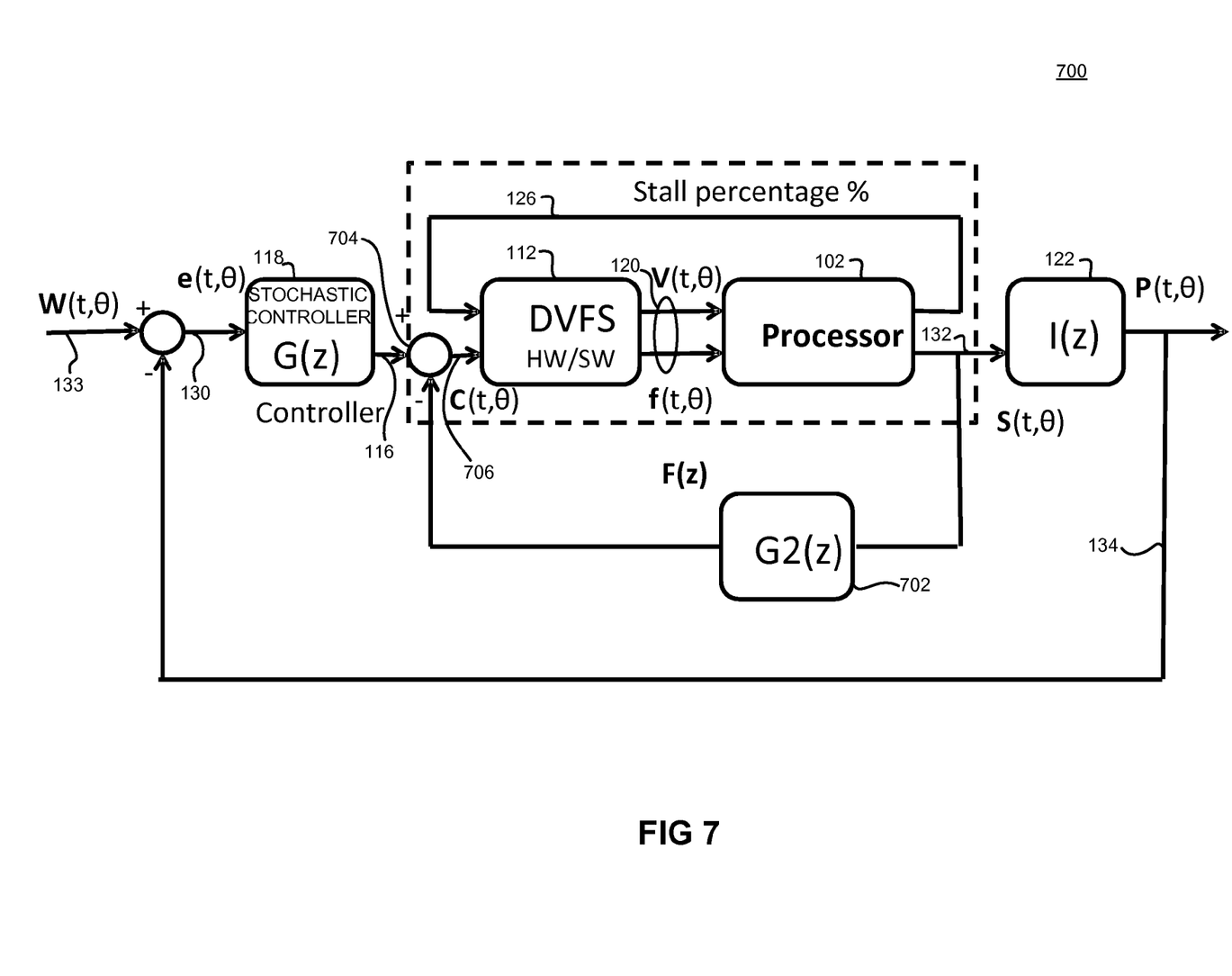
FIG. 7 is a block diagram illustrating another example of an electronic apparatus that employs a dynamic voltage and clock frequency scaling control system in accordance with one example set forth in the disclosure.

FIG. 7 is another illustration of an apparatus (which may include a display and memory and other components) similar to FIG. 1 and the apparatus of FIG. 6, and may be any suitable apparatus. In this example, an additional feedback controller 702 is employed which may be another processor, state machine or any other suitable circuit and is coupled to the processor core 102 and to the dynamic voltage and clock frequency scaling circuit 112 through an additional summing circuit 704. The summing circuit 704 is also coupled to receive the DVFS control information 116 from stochastic controller 118. The summing circuit 704 outputs control information 706 to the DVFS circuit, but since the feedback controller 702 is in an inner feedback loop, it may more quickly adjust the performance of the DVFS circuit. It may be implemented as a PID controller which may be, for example as known in the art, configured as a constant proportional controller if desired to reduce the response time of the DVFS circuit 112. The feedback controller increases the speed of the dynamic voltage and clock frequency scaling circuit 112 when it is, for example, set as a proportional controller.

Figure 8:
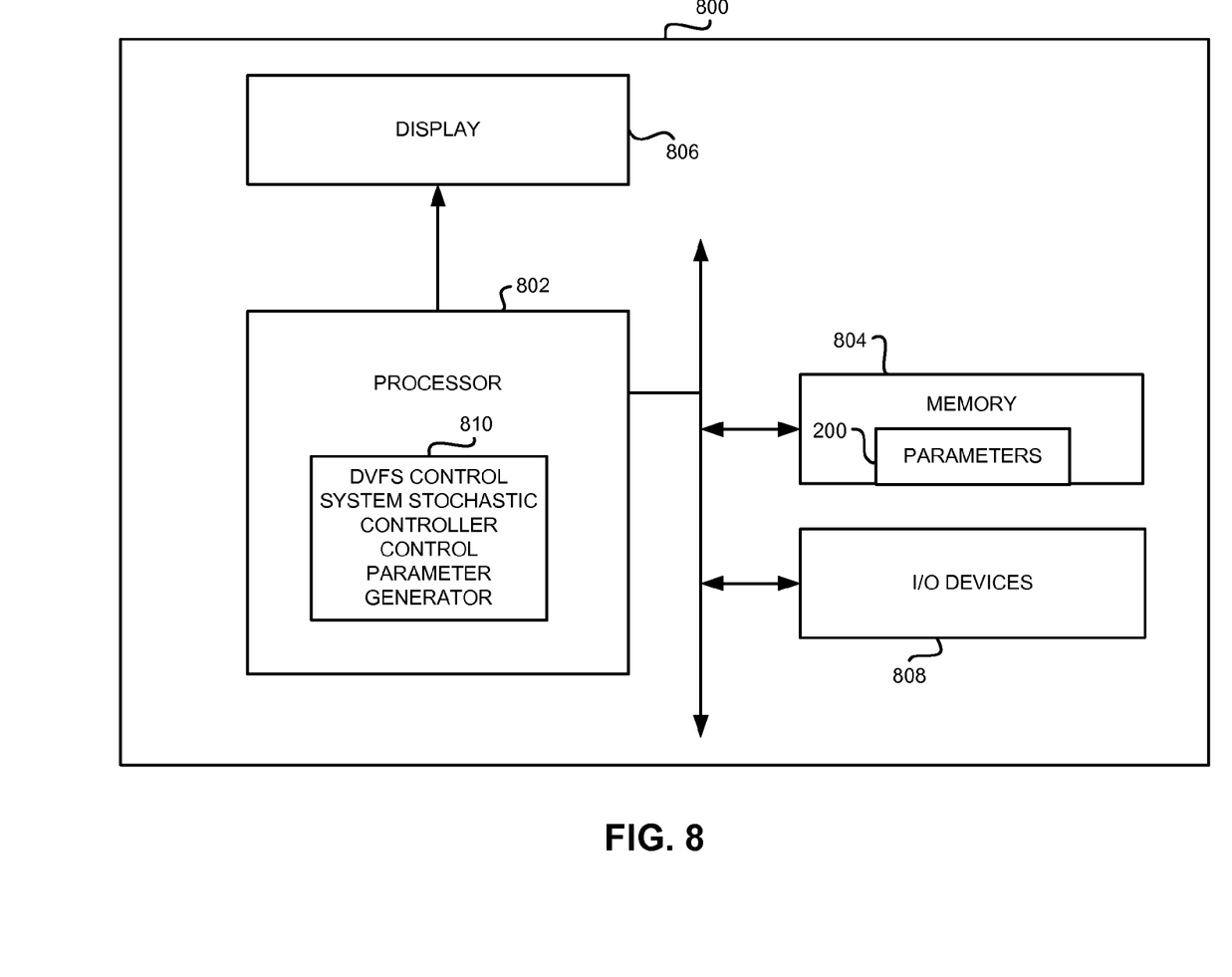
FIG. 8 is a block diagram of a processor core power control design system in accordance with one example set forth in the disclosure.

FIG. 8 is a block diagram of one example of a processor core power control design system, such as a work station or other suitable computer. As shown, the system 800 may include a processor 802, memory 804, display 806, suitable I/O devices 808 coupled in a conventional manner through buses or other suitable communication interfaces as known in the art. The memory 804 such as RAM, ROM or any other suitable memory stores executable instructions that when executed by the processor 802, cause the processor 802 to generate the stochastic controller control parameters. Accordingly, a DVFS control system stochastic controller control parameter generator 810 is shown. This is implemented as executing software so that the processor serves as the generator 810. The generator 810 generates the parameters 200 and may store them in memory 804. These parameters 200 may then be downloaded to the apparatus 100 and stored in local memory for use during runtime operation. The Processor core power control design system determines the stochastic controller control parameters for a dynamic voltage and clock frequency scaling control system by applying a random process decomposition operation on random workload input information of a processor core as further set forth below. The system, via the processor 802, performs a Fourier transform on the random process decomposition coefficients to determine frequency components of random process decomposition coefficients and produces the stochastic controller control parameters 200 based on the reducing control error or error gain to a desired level for a stochastic controller. The system performs the other operations described herein necessary to generate the stochastic controller control parameters 200.

Characterize Workloads by Random Process Representation

The uncertainty of the real-time workload of a processor can be captured by a random process description. Karhunnen Loeve Expansion (KLE) is a spectrum representation of random processes (see R. G. Ghanem et al., "Stochastic Finite Elements: A Spectral Approach", Dover Publications, Inc., Mineola, N.Y., revised edition, 2003 (hereinafter "Ghanem et al.")).

It can be proved that a zero-mean square-integerable discrete-time random process $W(t, \theta)$ can be represented by a denumerable set of orthogonal random variables (RVs) in the form Ghanem et al., B. Wu et al. ("An analytical approach for dynamic range estimation", *ACM/IEEE 41st Design Automation Conference*, San Diego, Calif., pp. 472-477, Jun. 7-11, 2004), and B. Wu et al. ("Dynamic Range Estimation", IEEE Transactions on Computer-Aided Design of Integrated Circuits and Systems, Vol. 25 Issue: 9 (1618-1636) 2006).

$$W(t, \theta) = \sum_{i=1}^{\infty} w_i(t)\mu_i(\theta) \quad t = 1, 2, 3, \ldots \tag{1}$$

where t is the discrete time index and $\theta$ represents a point in the random space. The workload defined on discrete time index means the desired total number of executed instructions or total throughput (or the normalized instruction or throughput number) over the period from the reference time $t_0$ to time t. Its mean is usually non-zero and increases with time. For the sake of mathematical simplicity, it is assumed to be zero-mean here, but this treatment is easy to extend to a non-zero mean case by adding a mean function in KLE. $\mu_i$ are a set of orthogonal RVs with zero mean and unity variance. $w_i(t)$ are a set of orthogonal deterministic functions defined on the discrete time domain and termed random process decomposition coefficients. Orthogonality of $\mu_i$ set and $w_i(t)$ means $$E[\mu_i \mu_j] = \begin{cases} 1 & \text{if } i = j \\ 0 & \text{otherwise} \end{cases} \tag{2}$$

and $$\sum_{t=1}^{\infty} w_i(t) w_j(t) = \begin{cases} \lambda_i & \text{if } i = j \\ 0 & \text{otherwise} \end{cases}. \tag{3}$$

In the case of non-zero means, $W(t, \theta)$ defined over finite discrete time domain, Eq. (1) becomes $$W(t, \theta) = \overline{W}(t, \theta) + \sum_{i=1}^{N} w_i(t)\mu_i(\theta) \quad t = 1, 2, \ldots, N \tag{4}$$

$\overline{W}(t, \theta)$ is the mean function of $W(t, \theta)$. It is a deterministic function in time domain. $w_i(t)$ can be computed by solving the eigenvalue equation of autocorrelation matrix of $W(t, \theta)$.

$$Rv_i = \lambda_i v_i \tag{5}$$

and $$R = \begin{bmatrix} R(1,1) & R(1,2) & \ldots & R(1,n) \\ R(2,1) & R(2,2) & \ldots & R(2,n) \\ \vdots & \vdots & \ddots & \vdots \\ R(n,1) & R(n,2) & \ldots & R(n,n) \end{bmatrix} \tag{6}$$

where $R(i, j) = E[(W(i, \theta) - \overline{W}(i, \theta))(W(j, \theta) - \overline{W}(j, \theta))]$ $i, j = 1, 2, \ldots, N$. Because autocorrelation matrix R is positive semidefinite, its eigenvalues $\lambda_i$, are non-negative. They are usually ordered from the largest one to the smallest; that is, $\lambda_1 > \lambda_2 > \ldots > \lambda_N$. $v_i$ are all orthornormal vectors.

KLE coefficient functions $w_i(t)$ can be computed in a vector format.

$$[w_i(1) w_i(2) \ldots w_i(N)]^T = \sqrt{\lambda_i} v_i \tag{7}$$

KLE is optimal in the sense that it minimizes the total mean squared errors caused by the truncation of the expansion. KLE adapts to the process to produce the best possible basis for its expansion. The mean squared contribution of every $w_i(t)$ to $W(t, \theta)$ is proportional to the value of its corresponding $\lambda_i$. When a real random process is expanded by KLE, usually most of the contribution to $W(t, \theta)$ is concentrated only on few $w_i(t)$, which correspond to the larges eigenvalues $\lambda_i$. It is said that KLE optimally compacts the random signal energy. By utilizing this feature, a system can effectively truncate KLE to reduce computation and minimize the error. The relative mean squared error caused by removing $w_m(t)$ to $w_N(t)$ terms is $$r_c = \frac{\sum_{i=m}^{N} \lambda_i}{\sum_{i=1}^{N} \lambda_i} \quad (8)$$

Analysis of the System Response Under Random Workload Input

Utilizing the method above, the random workload input to a DVFS control system can be represented in the form of Eq. (4). To make the notation more compact, Eq. (4) can be written as $$W(t) = \sum_{i=0}^{N} w_i(t)\mu_i \quad (9)$$

$$t = 1, 2, \ldots, N$$

In this equation, one can omit $\theta$ and define $w_o(t) = \overline{W}(t, \theta)$ and $\mu_i = 1$. Consider the DVFS control system illustrated in FIG. 1. If one denotes the linear system relation from input $W(t)$ to system error signal $e(t)$ by linear operator $\mathcal{L}_e(\cdot)$ and apply Eq. (9), it follows $$e(t) = \mathcal{L}_e(W(t)) = \mathcal{L}_e\left(\sum_{i=0}^{N} w_i(t)\mu_i\right) \quad (10)$$

$$= \sum_{i=0}^{N} \mathcal{L}_e(w_i(t))\mu_i$$

In this derivation, the supposition property of linear systems is utilized. Additionally, $\mu_i$ are constants over time even though they are RVs. Therefore, they can be taken out directly from the linear system operator $\mathcal{L}_e(\cdot)$. If the second-order moments of $e(t)$ are calculated, one can find $$E[e^2(t)] = E\left[\left(\sum_{i=0}^{N} \mathcal{L}_e(w_i(t))\mu_i\right)^2\right] \quad (11)$$

Considering the orthogonal property in Eq. (2), Eq. (11) can be further reduced to obtain these equations:

$$E[e^2(t)] = \sum_{i=0}^{N} \mathcal{L}_e(w_i(t))^2 \mathrm{Var}(e(t)) = \sum_{i=1}^{N} \mathcal{L}_e(w_i(t))^2 \quad (12)$$

The second equation above removes the mean response term to obtain variance. In the same fashion, similar random process descriptions for other signals can be derived (such as $C(t)$, $S(t)$, and $P(t)$ in FIG. 1) in the control system. Particularly, for the system output signal $$P(t) = \sum_{i=0}^{N} \mathcal{L}(w_i(t))\mu_i, \quad (13)$$

$$E[P^2(t)] = \sum_{i=0}^{N} \mathcal{L}(w_i(t))^2$$

$$\mathrm{Var}(P(t)) = \sum_{i=0}^{N} \mathcal{L}(w_i(t))^2 \quad (14)$$

In Eqs. (13)-(14), $\mathcal{L}(\cdot)$ denotes the linear system operator from input $W(t)$ to system output $P(t)$. In Eqs. (10)-(14), $\mathcal{L}(w_i(t))$ and $\mathcal{L}_e(w_i(t))$ are responses to deterministic input $w_i(t)$ at system output node and system error node respectively. From this derivation, all system responses from the input random process can be computed, and solving system responses to one random process input is reduced to solving the system responses to $N+1$ deterministic inputs. One realization of the input random process (i.e., one sample workload trace) corresponds to one set of fixed sample values of $\mu_i$.

Stochastic Controller Design

In this sub-section, the expected value of total squared error is minimized over the entire input space. The optimality of the stochastic control design is in the averaged statistical sense. From Eq. (12), statistically minimizing squared system error is equivalent to minimizing the sum of squared responses to a set of deterministic inputs $w_i(t)$ (i.e., the KLE coefficient functions).

Time-Domain Optimization Approach

A straightforward operation is to formulate the controller design as an optimization problem and solve the controller design problem in time domain. $\mathcal{L}_e(w_i(t))$ in equation (12) can be calculated as convolution $$\mathcal{L}_e(w_i(t)) = \sum_{k=1}^{N} h(k) w_i(i-k) \quad (15)$$

$$= \sum_{k=1}^{N} h_k w_i(i-k)$$

$h(k)$ is the impulse response of linear system $\mathcal{L}_e(\cdot)$ and it is denoted by $h_k$ in the following discussion. The optimum controller should satisfy the following equations $$\frac{\partial E[e^2(t)]}{\partial h_k} = \frac{\partial \left(\sum_{i=0}^{N}\left(\sum_{k=1}^{N} h_k w_i(i-k)\right)^2\right)}{\partial h_k} \quad (16)$$

$$= 0$$

$$k = 1, 2, \ldots, N$$

$h_k$ can be solved from the above equations and the physical constraints of $h_k$: $h_k \neq 0$; $h_k$, $k=1, 2, \ldots$ are deceasing exponential sequence or linear combination of decreasing exponential sequences; the controller parameters corresponding to $h_k$, must be within the dynamic range of registers or memory used to store the parameters.

Frequency Domain Design Approach

The frequency-domain approach to design the controller $G(z)$ is considered below. By examining equation (12), it can be seen that $E[e^2(t)]$ (equals to the sum of squared responses to $w_i(t)$) can be made minimum or very small if every deterministic KLE coefficient functions $w_i(t)$ can be greatly attenuated by linear system operator $\mathcal{L}_e(\bullet)$. From the control loop structure (see FIG. 1), the transfer function corresponding to $\mathcal{L}_e(\bullet)$ is $$H_e(z) = \frac{1}{1 + G(z)F(z)I(z)} \quad (17)$$

where G(z) is the controller transfer function, F(z) is processor DVFS hardware transfer function, and $$I(z) = \frac{1}{1 - z - 1}$$

denotes the inherent integrator block. I(z) and F(z) are considered the control plant and they are fixed. The stochastic controller G(z) is adjustable. To make $\mathcal{L}_e(\bullet)$ attenuate deterministic functions $w_i(t)$, G(z) and also G(z)F(z)I(z) must have large gain to $w_i(t)$.

Next, characteristics of the input random process of processor workload are considered. The processor in this example, during runtime, generates the stochastic controller control parameters based on applying a random process decomposition operation on runtime workload information W and other appropriate operations (such as Fourier analysis, error reduction, etc.). Instead of the processor, a different system may evaluate expected runtime workload information and produce the controller parameters for storage in the apparatus 100. The mean of input workload $w_0(t)$ is a nondecreasing function in time domain, and usually it is a ramp function or a function close to ramp. Generally speaking, if the newly generated workload per unit time can be modeled as stationary processes, their workload means are ramp functions. To track a ramp input with a constant steady error, one integrator is used in the control loop transfer function (that is G(z)F(z)I(z) in FIG. 1). To track the ramp functions with zero steady state error, at least two integrators in the control loop should be used. Because there is already an integrator I(z) in the loop, for a nearly ramp $w_0(t)$, a controller G(z) with one integrator may be used to ensure the zero-error tracking.

For other $w_i(t)$ functions (i>0), they are usually dominated by a very narrow frequency band. The frequency band moves to high frequency end when the function index i increases. To ensure minimization of e(t), the stochastic controller 118 G(z) should generate very high gain in these, frequency bands. However, as mentioned above, the importance of every $w_i(t)$ is not the same. The spectrum contribution of functions $w_i(t)$ decreases with the eigenvalue index i increasing. An important advantage of KLE representation is that it concentrates the spectrum contribution on the least number of $w_i(t)$ functions. When the input workload is expanded by KLE, the number of $w_i(t)$ could be large, but only a small fraction of them (associated with small i indexes) are significant. Therefore, when designing the stochastic controller G(z), only the frequency bands of the first few $w_i(t)$ corresponding to the largest eigenvalues $\lambda_i$ need to be considered.

Minimizing the total squared errors over time in frequency domain is now considered. From equation (12), the total mean squared error caused by $w_i(t)$ (i>0) is $$\sum_{i=1}^{N} E[e^2(t)] = \sum_{t=1}^{N} \sum_{i=1}^{N} \mathcal{L}_e(w_i(t))^2 \quad (18)$$

$$= \sum_{i=1}^{N} \sum_{t=1}^{N} \mathcal{L}_e(w_i(t))^2$$

Let $y_i(t) = \mathcal{L}_e(w_i(t))$, it can be seen $$Y_i(z) = H_e(z)W_i(z) \quad (19)$$

$Y_i(z)$, $W_i(z)$, and $H_e(z)$ are z trans forms of $y_i(t)$ and $w_i(t)$, and the close-loop transfer function of control error respectively. The energy spectrum of $y_i(t)$ is $$|Y_i(e^{j\omega})|^2 = |Y_i(z)|_{z=e^{j\omega}}^2 = |H_e(e^{j\omega})|^2|W_i(e^{j\omega})|^2 \quad (20)$$

In equation (20) $\omega$ is angular frequency (radian per sampling period), and notation $[X]^2$ is defined as $[X]^2 = XX^*$ ($X^*$ is the complex conjugate of X).

By Parseval's theorem, $$\sum_{t=1}^{N} y_i^2(t) = \frac{1}{2\pi} \int_{-\pi}^{\pi} |Y_i(e^{j\omega})|^2 d\omega \quad (21)$$

$$= \frac{1}{2\pi} \int_{-\pi}^{\pi} |H_e(e^{j\omega})|^2 |W_i(e^{j\omega})|^2 d\omega$$

By workload characterization, one can see that $w_i(t)$ usually are sine functions or very close to sine function. This means that the energy of $w_i(t)$ is concentrated around the frequency of this sine function. Applying Parseval's theorem to $w_i(t)$ and considering equation (3), it follows $$\sum_{t=1}^{N} w_i^2(t) = \frac{1}{2\pi} \int_{-\pi}^{\pi} |W_i(e^{j\omega})|^2 d\omega \quad (22)$$

$$= \lambda_i$$

It is assumed that the energy spectrum $W_i(e^{j\omega})$ has the maximum peak at frequency $\omega_i$. Because energy of $w_i(t)$ is concentrated in a very narrow frequency band around $\omega_i$, approximately it is assumed that energy spectrum $W_i(e^{j\omega})$ is an ideal impulse at $\omega_i$ and all energy at $w_i(t)$ is located at $\omega_i$. Therefore, $$|W_i(e^{j\omega})|^2 = 2\pi\lambda_i \delta(\omega_i - \omega) \quad (23)$$

Substitute equation (23) into equation (21), it follows $$\sum_{t=1}^{N} y_i^2(t) = \sum_{t=1}^{N} E[e^2(t)] \quad (24)$$

$$= |H_e(e^{j\omega_i})|^2 \lambda_i$$

Therefore, one can formulate the controller design as an optimization problem. In the optimization iterations, the parameters in controller G(z) are adjusted to minimize the optimization objective.

$$\text{Opt\_objective} = \sum_{i=1}^{N} |H_e(e^{j\omega_i})|^2 \lambda_i \quad (25)$$

Because the physical registers or memories to store the controller parameters all have finite bits and usually fewer bits are desired for these registers and memories to restrict the dynamic ranges of controller parameters, the practical optimization objective should be $$\text{Opt\_objective} = \sum_{i=1}^{N} |H_e(e^{j\omega_i})|^2 \lambda_i - \varepsilon \quad (26)$$

$\epsilon$ is a small positive number, which can be chosen according to the control precision requirement of the specific application. It usually can be set equal or less than the desired average relative squared error.

For example, if a PID type controller is chosen, the stochastic controller 118 G(z) has the following format $$G(z) = K_p + K_i \frac{1}{z-1} + K_d(z-1) \quad (27)$$

$H_e(z)$ is calculated by equation (17). Except for G(z), all other transfer functions in (17) are known. $K_p$, $K_i$, and $K_d$ are the stochastic controller control parameters adjusted to make the objective function minimum. The stability condition of $H_e(z)$ (all poles are inside the unity circle) can be set as an optimization constraint. It will be checked in every iteration. The stability condition can also be satisfied by adjusting the overall gain of the stochastic controller G(z) to obtain enough phase margin for the stability purpose after the optimization is solved. It will be recognized that other linear controllers may also be employed.

To summarize, a frequency domain open loop approach is adopted to design the stochastic controller 118 G(z) and use of the time domain optimization is used to refine the stochastic controller control parameters locally. In the frequency domain design stage, the number of integrators in the stochastic controller G(z) is determined by the mean function $w_0(t)$ of input workload. The passband and passband gain of G(z) are determined by the frequency bands of principle components among all $w_i(t)$ (i>0). When designing the passband of G(z), one should consider the phase margin of G(z) F(z) I(z) to ensure the close-loop stability. After an initial controller G(z) is obtained, a time-domain optimization may be used to further refine it in a constrained small range if desired.

From the above DVFS control design methodologies, it can be seen that the stochastic controller design is only related to autocorrelation function and mean function of random input workload W(t). Two implications can be drawn from this fact. If different kinds of random workload inputs have similar mean and autocorrelation function (or similar frequency bands for $w_i(t)$ i>0), then one can use the same controller G(z) to make the workload-performance discrepancy small. Multiple stochastic controllers G(z) may be used for multiple different random workload classes. The processor may monitor the important workload parameters (means, autocorrelation, bandwidth of $w_i(t)$ etc.), and load different controllers or controller parameters during runtime.

The ultimate goal of DVFS control is to reduce the power consumption of processors and save energy, while the tight performance or QoS requirements (e.g., video that is not choppy) are still satisfied. Therefore, the proposed designs are applicable to different applications.

As outlined earlier, in the disclosed approach, the characterization of the workloads provide valuable information for designing a suitable controller. The statistical mean of the characterized input workload $w_0(t)$ is nondecreasing and provides a guidance for selecting the order of the controller. The knowledge of other "stochastic" components of the loads ($w_i(t)$ (i>0)) offers insights on the bandwidth and frequency characteristics for the controller. It has been found that the disclosed stochastic control scheme can reduce the error by orders of magnitude compared to other approaches.

Disclosed is a KLE-based stochastic workload characterization approach, which is leveraged for a new feedback controller design for DVFS control. The new design has been shown to not only produce significant power saving but also provide a performance bound that is tighter than the existing feedback control scheme.

Also, integrated circuit design systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and circuits described herein may also be produced as integrated circuits by such systems using the computer readable medium with instructions stored therein. For example, an integrated circuit with the aforedescribed logic and structure may be created using such integrated circuit fabrication systems. In such a system, the computer readable medium, such as RAM, ROM or other suitable form of memory, stores instructions executable by one or more integrated circuit design systems that causes the one or more integrated circuit design systems to produce an integrated circuit. The integrated circuit as described above includes logic operative to generate dynamic voltage and clock frequency scaling control information based on stochastic controller control parameters and workload performance error data; and vary at least one processor core voltage and clock frequency for the at least one processor core based on the generated dynamic voltage and clock frequency scaling control information, in addition to other functions as described herein.

As described above, the statistics of the workload are calculated and a controller such as a programmable PID controller is programmed in real-time. The controller can be adaptive to runtime workloads. The controller parameters can be updated periodically or updated when the workload statistics change significantly. Other advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for controlling power consumption of at least one processor core comprising:

generating dynamic voltage and clock frequency scaling control information based on stochastic controller control parameters and workload performance error data; and varying at least one processor core voltage and clock frequency for the at least one processor core based on the generated dynamic voltage and clock frequency scaling control information.

2. The method of claim 1 comprising generating the stochastic controller control parameters based on processor core runtime workload information from one or more processor cores and based on at least in part applying a random process decomposition operation on the runtime workload information.

3. The method of claim 2 wherein applying the random process decomposition operation on the runtime workload information comprises applying a Karhunnen Loeve expansion (KLE) operation as part of a stochastic controller control parameter generation operation.

4. The method of claim 1 comprising storing a plurality of sets of stochastic controller control parameters and wherein varying at least one processor core voltage and clock frequency for the at least one processor core comprises selecting a different set of stochastic controller control parameters for use by a stochastic controller based on determined changes in processor core workload information.

5. The method of claim 1 wherein generating dynamic voltage and clock frequency scaling control information based on stochastic controller control parameters comprises programming a proportional-integral-derivative (PID) controller with the stochastic controller control parameters and wherein varying at least one processor core voltage and clock frequency for the at least one processor core is also based on data representing an amount of stall of the at least one processor core.

6. The method of claim 1 comprising generating the stochastic controller control parameters by:
calculating an autocorrelation function of random workload input for the at least one processor core based on input samples from random workload input data or analytic description information of processor workload input data;
determining random process decomposition coefficients by solving an eigen value equation of an autocorrelation matrix generated from the autocorrelation function; and
using the random process decomposition coefficients to produce the stochastic controller control parameters by:
performing a Fourier transform on the random process decomposition coefficients to determine frequency components of the random process decomposition coefficients and producing the stochastic controller control parameters based on reducing error to a desired level.

7. An electronic apparatus comprising:
at least one processor core;
a dynamic voltage and clock frequency scaling circuit operatively coupled to the at least one processor core and operative to vary at least one processor core voltage and clock frequency for the at least one processor core based on dynamic voltage and clock frequency scaling control information; and
a stochastic controller, operatively coupled to the dynamic voltage and clock frequency scaling circuit, operative to generate the dynamic voltage and clock frequency scaling control information based on stochastic controller control parameters and workload performance error data.

8. The electronic apparatus of claim 7 comprising memory that comprises the stochastic controller control parameters and wherein the at least one processor core is operative to generate the stochastic controller control parameters based on processor core runtime workload information and based at least in part on applying a random process decomposition operation on the runtime workload information.

9. The electronic apparatus of claim 7 wherein the at least one processor core is operative to
apply the random process decomposition operation on the runtime workload information by applying a Karhunnen Loeve expansion (KLE) operation as part of a stochastic controller control parameter generation operation.

10. The electronic apparatus of claim 9 wherein the at least on processor core is comprised of at least one of a central processor core and a graphics processor core and wherein the apparatus comprises a display operatively coupled to the at least one processor core.

11. The electronic apparatus of claim 7 comprising memory that stores a plurality of sets of stochastic controller control parameters and wherein varying at least one processor core voltage and clock frequency for the at least one processor core comprises selecting, by the at least one processor core, a different set of stochastic controller control parameters for use by the stochastic controller based on determined changes in processor core workload information.

12. The electronic apparatus of claim 7 wherein the stochastic controller is comprised of a proportional-integral-derivative (PID) controller that uses the stochastic controller control parameters and wherein the dynamic voltage and clock frequency scaling circuit varies at least one processor core voltage and clock frequency for the at least one processor core based on data representing an amount of stall of the at least one processor core.

13. The electronic apparatus of claim 12 comprising a feedback controller, operatively coupled to the at least one processor core and to the dynamic voltage and clock frequency scaling circuit, operative to increase the speed of the dynamic voltage and clock frequency scaling circuit.

14. A processor core power control design system comprising:
one or more processors;
memory, operatively coupled to the one or more processors, containing executable instructions that when executed by the one or more processors, causes the one or more processors to:
determine stochastic controller control parameters for a dynamic voltage and clock frequency scaling control system by:
applying a random process decomposition operation on random workload input formation of a processor core, performing a Fourier transform on the random process decomposition coefficients to determine frequency components of the random process decomposition coefficients and producing the stochastic controller control parameters based on reducing error to a desired level for a stochastic controller.

15. The system of claim 14 wherein the memory contains executable instructions that when executed by the one or more processors, causes the one or more processors to determine stochastic controller control parameters for a dynamic voltage and clock frequency scaling control system by:
calculating an autocorrelation function of random workload input for the at least one processor core based on input samples from random workload input data or analytic description information of processor workload input data;

determining random process decomposition coefficients by solving an eigen value equation of an autocorrelation matrix generated from the autocorrelation function; and using the random process decomposition coefficients to produce the stochastic controller control parameters by: performing a Fourier transform on the random process decomposition coefficients to determine frequency components of the random process decomposition coefficients and producing the stochastic controller control parameters based on reducing error to a desired level.

16. The system of claim 15 wherein the memory contains executable instructions that when executed by the one or more processors, causes the one or more processors to apply a Karhunnen Loeve expansion (KLE) operation to generate the stochastic controller control parameters.

17. A non-transitory computer readable medium comprising executable instructions that when executed by an integrated circuit design system, causes the integrated circuit design system to produced an integrated circuit that comprises:

at least one processor core;

a dynamic voltage and clock frequency scaling circuit operatively coupled to the at least one processor core and operative to vary at least one processor core voltage and clock frequency for the at least one processor core based on dynamic voltage and clock frequency scaling control information; and a stochastic controller, operatively coupled to the dynamic voltage and clock frequency scaling circuit, operative to generate the dynamic voltage and clock frequency scaling control information based on stochastic controller control parameters and workload performance error data.

18. The non-transitory computer readable medium of claim 17 comprising executable instructions that when executed by the integrated circuit design system, causes the integrated circuit design system to produce the integrated circuit that comprises memory that comprises the stochastic controller control parameters and wherein the at least one processor core is operative to generate the stochastic controller control parameters based on processor core runtime workload information and based at least in part on applying a random process decomposition operation on the runtime workload information.

19. The non-transitory computer readable medium of claim 17 comprising executable instructions that when executed by the integrated circuit design system, causes the integrated circuit design system to produce the integrated circuit wherein the at least one processor core is operative to:

apply the random process decomposition operation on the runtime workload information by applying a Karhunnen Loeve expansion (KLE) operation as part of a stochastic controller control parameter generation operation.

20. The non-transitory computer readable medium of claim 17 comprising executable instructions that when executed by the integrated circuit design system, causes the integrated circuit design system to produce the integrated circuit wherein the at least one processor core voltage and clock frequency for the at least one processor core is controlled based on a selected different set of stochastic controller control parameters used by the stochastic controller based on determined changes in processor core workload information.

* * * * *